No. 624,074. Patented May 2, 1899.
E. E. NORTHWAY.
LOCKING DEVICE FOR WICK RAISERS.
(Application filed June 23, 1898.)
(No Model.)
FIG. I
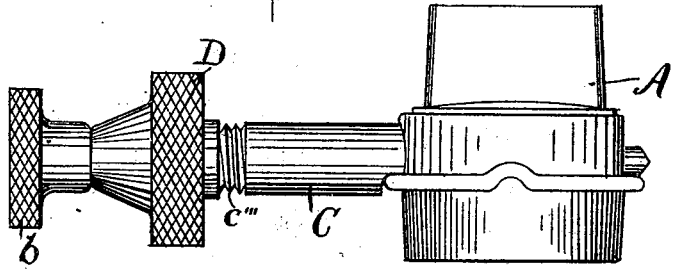
FIG. III
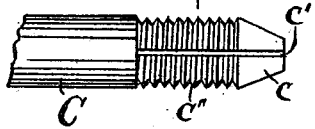
FIG. IV
FIG. II
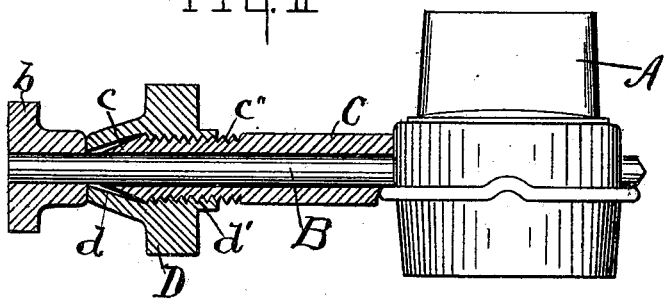
WITNESSES:
Philip E. Knowlton
Chas. P. Cockburn.
INVENTOR:
E. E. Northway,
by Wm. E. Leclur
ATTORNEY
THE NORRIS PETERS CO., PHOTO-LITHO., WASHINGTON, D. C.

UNITED STATES PATENT OFFICE.

ELMER E. NORTHWAY, OF CLEVELAND, OHIO.

LOCKING DEVICE FOR WICK-RAISERS.

SPECIFICATION forming part of Letters Patent No. 624,074, dated May 2, 1899.

Application filed June 23, 1898. Serial No. 684,319. (No model.)

*To all whom it may concern:*

Be it known that I, ELMER E. NORTHWAY, a citizen of the United States, and a resident of Cleveland, county of Cuyahoga, and State of Ohio, have invented certain new and useful Improvements in Locking Devices for Wick-Raisers, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a side view of a lamp or lantern burner provided with my improvement; Fig. II, a side view of the burner, illustrating the locking device in section; Fig. III, a detail view of the end of the sleeve for the wick-raiser stem, and Fig. IV. a transverse section of the same.

The burner A and wick-raiser stem B are of the usual or of any desired construction, the latter being shown as provided with the usual milled button *b* for turning it. A sleeve C surrounds the wick-raiser stem, extending from the side of the burner to near the button upon the stem, and is prevented from turning upon the spindle by being cut away at its inner end to fit against the burner or by being secured to the burner or to other portion of the lamp. The outer end of the sleeve is tapering, as indicated at *c*, and has longitudinal slits *c'* and a screw-thread *c''*. A milled nut D, having a tapering bore portion *d* and an interior screw-thread *d'*, fits upon the end of the sleeve, so as to draw the slitted portions of the sleeve in upon the stem when the nut is screwed in upon the sleeve and to release said slitted portions from the stem when the nut is screwed out upon the sleeve. When the wick has been adjusted to its proper height by the stem, the nut is screwed in upon the sleeve, and the stem will thus be clamped by the slitted portions of the sleeve, thus preventing the stem from revolving and the wick from being moved. The wick may be adjusted by loosening the nut and turning the stem.

This locking means for the wick-raiser is a very desirable attachment for all kinds of lamps, but more particularly for portable lamps—such as bicycle-lamps, carriage-lamps, ships' lanterns, or portable lanterns—in which the wick is liable to be jarred out of its adjusted position by jolts or other motion of the support. The annoyance and inconvenience of such movements of the wick is particularly felt and is more liable to happen with bicycle-lamps than with any other kind of lamp. The attachment may be placed upon any kind of lamp having a wick-raiser stem or spindle without in any manner interfering with other portions of the lamp and can be added to lamps now made without any considerable addition of cost, the attachment being simple and inexpensive. The grip attained by the nut and slotted portion of the sleeve upon the wick-raiser stem is sufficient to hold the latter clamped during all jolts or jars to which any lamp may be subjected and remain lighted.

Other modes of applying the principle of my invention may be employed for the mode herein explained. Change may therefore be made as regards the mechanism thus disclosed, provided the principles of construction set forth, respectively, in the following claims are employed.

I therefore particularly point out and distinctly claim as my invention—

1. In combination with a wick-raiser stem, a split sleeve upon said stem and secured against movement upon the same, and means for tightening said sleeve upon said stem, substantially as set forth.

2. In combination with a wick-raiser stem; a sleeve surrounding said stem and secured against rotation and formed with a tapering end, a screw-thread at said end and longitudinal slits in said tapering and screw-threaded portions, and a nut upon the screw-thread and having an interior taper fitting over the tapering end of the sleeve, substantially as set forth.

In testimony that I claim the foregoing to be my invention I have hereunto set my hand this 30th day of August, A. D. 1897.

ELMER E. NORTHWAY.

Witnesses:
WM. SECHER,
PHILIP E. KNOWLTON.